(12) United States Patent
Wood

(10) Patent No.: US 9,896,193 B2
(45) Date of Patent: Feb. 20, 2018

(54) AERODYNAMIC STRUCTURE WITH ASYMMETRICAL SHOCK BUMP

(75) Inventor: Norman Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 1898 days.

(21) Appl. No.: 12/735,536

(22) PCT Filed: Feb. 17, 2009

(86) PCT No.: PCT/GB2009/050153
§ 371 (c)(1),
(2), (4) Date: Jul. 26, 2010

(87) PCT Pub. No.: WO2009/106872
PCT Pub. Date: Sep. 3, 2009

(65) Prior Publication Data
US 2010/0301173 A1    Dec. 2, 2010

(30) Foreign Application Priority Data

Feb. 29, 2008    (GB) .................................. 0803719.4

(51) Int. Cl.
*B64C 23/04*    (2006.01)
*B64C 23/00*    (2006.01)
*B64C 3/14*    (2006.01)

(52) U.S. Cl.
CPC .............. *B64C 23/04* (2013.01); *B64C 23/00* (2013.01); *B64C 2003/148* (2013.01); *B64C 2003/149* (2013.01)

(58) Field of Classification Search
CPC ......... B64C 23/04; B64C 23/06; B64C 21/10; B64C 2003/148; B64C 2230/26; B64C 2003/149; B64C 23/00

USPC ..................... 244/200, 200.1, 198, 130, 35 A
See application file for complete search history.

(56) References Cited

U.S. PATENT DOCUMENTS

| | | | | | |
|---|---|---|---|---|---|
| 2,532,753 | A | * | 12/1950 | Beman ........................... | 244/198 |
| 2,800,291 | A | * | 7/1957 | Stephens ........................ | 244/200 |
| 2,898,059 | A | * | 8/1959 | Whitcomb ..................... | 244/130 |
| 3,129,908 | A | * | 4/1964 | Harper .......................... | 244/219 |
| 3,578,264 | A | * | 5/1971 | Kuethe ...................... | 244/200.1 |
| 4,067,518 | A | * | 1/1978 | Paterson et al. .............. | 244/130 |
| 4,354,648 | A | * | 10/1982 | Schenk et al. .............. | 244/200.1 |

(Continued)

FOREIGN PATENT DOCUMENTS

| GB | 1 281 899 | 7/1972 |
|---|---|---|
| GB | 2 296 696 | 7/1996 |

(Continued)

OTHER PUBLICATIONS

International Search Report for PCT/GB2009/050153, dated Aug. 20, 2009.

(Continued)

*Primary Examiner* — Tien Dinh
*Assistant Examiner* — Steven Hawk
(74) *Attorney, Agent, or Firm* — Nixon & Vanderhye P.C.

(57) ABSTRACT

An aerodynamic structure comprising a shock bump (3) extending from its surface. The shock bump is asymmetrical about a plane of asymmetry, and the plane of asymmetry: passes through a centre (6) of the shock bump, is parallel with a principal direction of air flow over the structure, and extends at a right angle to the surface of the structure.

20 Claims, 2 Drawing Sheets

(56) References Cited

U.S. PATENT DOCUMENTS

| | | | |
|---|---|---|---|
| 4,643,376 A * | 2/1987 | Vanderhoeven | 244/198 |
| 5,058,837 A * | 10/1991 | Wheeler | 244/200.1 |
| 5,433,404 A * | 7/1995 | Ashill et al. | 244/200 |
| 5,692,709 A * | 12/1997 | Mihora et al. | 244/204 |
| 6,929,214 B2 * | 8/2005 | Ackleson et al. | 244/1 R |
| 7,118,071 B2 * | 10/2006 | Bogue | 244/130 |
| 7,784,737 B2 * | 8/2010 | Lee et al. | 244/129.1 |
| 8,016,245 B2 * | 9/2011 | Hassan et al. | 244/200.1 |
| 2006/0021560 A1 * | 2/2006 | McMillan et al. | 114/221 R |
| 2006/0060720 A1 | 3/2006 | Bogue | |
| 2007/0018055 A1 * | 1/2007 | Schmidt | 244/200 |
| 2009/0084906 A1 * | 4/2009 | Hassan et al. | 244/208 |
| 2009/0294596 A1 | 12/2009 | Sinha et al. | |

FOREIGN PATENT DOCUMENTS

| | | |
|---|---|---|
| JP | 4-138994 | 5/1992 |
| WO | WO 00/01578 | 1/2000 |
| WO | WO 2005/032938 | 4/2005 |

OTHER PUBLICATIONS

Written Opinion of the International Searching Authority for PCT/GB2009/050153, dated Aug. 20, 2009.
UK Search Report for GB 0803719.4, dated Apr. 27, 2008.
Ogawa et al., "Shock/Boundary-Layer Interaction Control Using Three-Dimensional Bumps for Transonic Wings", Collection of Technical Papers, vol. AIAA 2007-324, (Jan. 8, 2007), pp. 1-23.
Birkmeyer et al., "Shock Control on a Swept Wing", Aerospace Science and Technology, vol. 4, No. 3, (Jan. 1, 2000), pp. 147-156.
Holden, et al., "Shock/Boundary Layer Interaction Control Using 3D Devices", 41$^{st}$ AIAA Aerospace Sciences Meeting and Exhibit, vol. 41$^{st}$, No. Paper 2003-0447, (Jan. 6, 2003), pp. 1-8.
Dargel, G. et al., "21 Assessment of Shock and Boundary Layer Control Concepts for Hybrid Laminar Flow Wing Design", Drag Reduction by Shock and Boundary Layer Control. Results of the Project Euroshock II, Supported by the EP Union 1996-1999, vol. 80, (Jan. 1, 2002), pp. 383-414.
Milholen, W.E. II et al., "On the Application of Contour Bumps for Transonic Drag Reduction (Invited)", American Institute of Aeronautics and Astronautics 2005-0462, pp. 1-19.
U.S. Appl. No. 12/735,535, filed Jul. 26, 2010, Wood.
U.S. Appl. No. 12/735,540, filed Jul. 26, 2010, Wood.
U.S. Appl. No. 12/735,541, filed Jul. 26, 2010, Wood.
U.S. Appl. No. 12/735,534, filed Jul. 26, 2010, Wood.
International Search Report and Written Opinion of the International Searching Authority for PCT/GB2009/050150, dated Aug. 20, 2009.
UK Search Report for GB 0803727.7, dated Apr. 27, 2008.
International Search Report and Written Opinion of the International Searching Authority for PCT/GB2009/050152, dated Aug. 20, 2009.
UK Search Report for GB 0803724.4, dated Apr. 27, 2008.
International Search Report and Written Opinion of the International Searching Authority for PCT/GB2009/050154, dated Aug. 20, 2009.
UK Search Report for GB 0803730.1, dated Jun. 23, 2008.
International Search Report and Written Opinion of the International Searching Authority for PCT/GB2009/050151, dated Aug. 20, 2009.
UK Search Report for GB 0803722.8, dated Apr. 27, 2008.
Office Action dated Dec. 22, 2011 in co-pending U.S. Appl. No. 12/735,535.
Office Action dated Dec. 22, 2011 in co-pending U.S. Appl. No. 12/735,540.
Office Action dated Dec. 23, 2011 in co-pending U.S. Appl. No. 12/735,541.
Office Action dated Dec. 22, 2011 in co-pending U.S. Appl. No. 12/735,534.
Office Action dated Nov. 7, 2013 in co-pending U.S. Appl. No. 12/735,535.
Office Action dated Jul. 10, 2012 in co-pending U.S. Appl. No. 12/735,535.
Office Action dated Jun. 29, 2012 in co-pending U.S. Appl. No. 12/735,540.
Office Action dated Jun. 22, 2012 in co-pending U.S. Appl. No. 12/735,541.
Office Action dated Jun. 29, 2012 in co-pending U.S. Appl. No. 12/735,534.
EP Examination Report dated Jan. 2, 2014 in EP 09713923.2.
Russian Office Action dated Jan. 21, 2013 in RU 2010139003/11(055759) and English translation.

* cited by examiner

AERODYNAMIC STRUCTURE WITH ASYMMETRICAL SHOCK BUMP

This application is the U.S. national phase of International Application No. PCT/GB2009/050153 filed 17 Feb. 2009, which designated the U.S. and claims priority to GB Application No. 0803719.4 filed 29 Feb. 2008, the entire contents of each of which are hereby incorporated by reference.

FIELD OF THE INVENTION

The present invention relates to an aerodynamic structure comprising a shock bump extending from its surface.

BACKGROUND OF THE INVENTION

As described in Holden, H. A. and Babinsky, H. (2003) *Shock/boundary layer interaction control using 3D devices* In: 41st Aerospace Sciences Meeting and Exhibit, Jan. 6-9, 2003, Reno, Nev., USA, Paper no. AIAA 2003-447, as a transonic flow passes over a 3-D shock bump the supersonic local conditions induce a smeared shock foot with a lambda-like wave pattern.

The bumps described in Holden et al. are asymmetrical fore and aft, typically increasing in height and/or width to a maximum height and/or width to the rear of the centre of the shock bump. In other words, the bumps are asymmetrical about a plane which passes through a centre of the shock bump and is normal to the free stream direction. However, to date all evaluations of three-dimensional shock bumps have been restricted to laterally symmetric bump shapes, aligned with the free stream direction. In other words, conventional shock bumps are symmetrical about a plane which passes through a centre of the shock bump, is parallel with the free stream direction, and extends at a right angle to the surface of the aerofoil.

US 2006/0060720 uses a shock control protrusion to generate a shock extending away from the lower surface of a wing.

SUMMARY OF THE INVENTION

A first aspect of the invention provides an aerodynamic structure comprising a shock bump extending from its surface, wherein the shock bump is asymmetrical about at least one plane of asymmetry, and wherein the plane of asymmetry:
  a. passes through a centre of the shock bump,
  b. is parallel with the free stream direction, and
  c. extends at a right angle to the surface of the aerodynamic structure.

The shock bump may have no planes of symmetry, or may have a plane of symmetry which is skewed relative to the plane of asymmetry as defined above.

Typically the shock bump has a leading edge, a trailing edge, an inboard edge and an outboard edge. The bump may merge gradually into the surface at its edges or there may be an abrupt concave discontinuity at one or more of its edges.

Typically the shock bump has substantially no sharp convex edges or points.

Typically the shock bump is shaped and positioned so as to modify the structure of a shock which would form adjacent to the surface of the structure in the absence of the shock bump when the structure is moved at transonic speed. This can be contrasted with US 2006/0060720 which uses a shock control protrusion to generate a shock which would not otherwise exist in the absence of the shock control protrusion.

A second aspect of the invention provides an aerodynamic structure comprising a shock bump extending from its surface, wherein the shock bump has no plane of symmetry.

The following comments apply to both aspects of the invention.

Typically the shock bump has an asymmetrical shape when viewed in cross-section in a plane which is normal to the principal direction of air flow over the surface. For instance the asymmetrical cross-sectional shape may have an apex which is offset to one side, typically towards an inboard side of the shock bump. In the embodiments described below the cross-sectional shape is curved with an apex at a single point. Alternatively the apex may be flat.

The apex of the shock bump (whether a line or a flat plateau-like area) may be straight or may follow a line which appears curved when viewed at a right angle to the surface of the aerodynamic structure.

The aerodynamic structure may comprise an aerofoil such as an aircraft wing, horizontal tail plane or control surface; an aircraft structure such as a nacelle, pylon or fin; or any other kind of aerodynamic structure such as a turbine blade.

In the case of an aerofoil the shock bump may be located on a high pressure surface of the aerofoil (that is, the lower surface in the case of an aircraft wing) but more preferably the surface is a low pressure surface of the aerofoil (that is, the upper surface in the case of an aircraft wing). Also the shock bump typically has an apex which is positioned towards the trailing edge of the aerofoil, in other words it is positioned aft of 50% chord. The apex of the bump may be a single point, or a flat plateau. In the case of a plateau then the leading edge of the plateau is positioned towards the trailing edge of the aerofoil.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
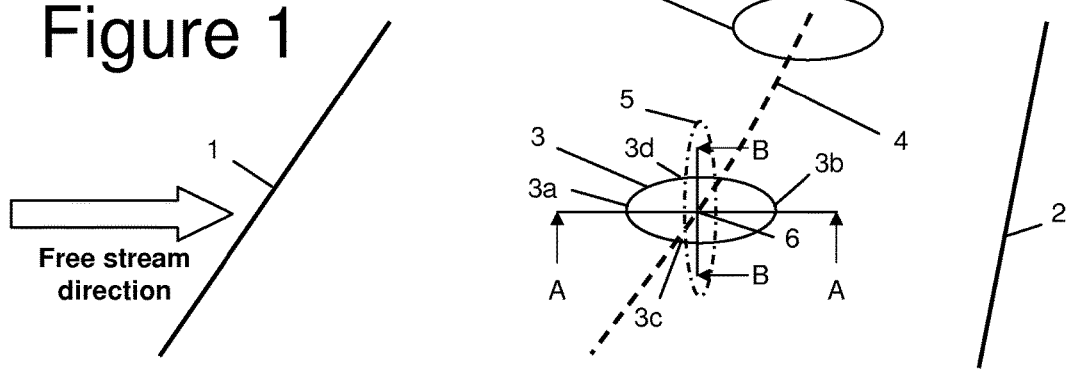
FIG. 1 is a plan view of the top of an aircraft wing carrying a shock bump according to a first embodiment of the invention.

FIG. 1 is a plan view of the upper surface of an aircraft wing. The wing has a leading edge 1 and a trailing edge 2, each swept to the rear relative to the free stream direction.

Figure 2:
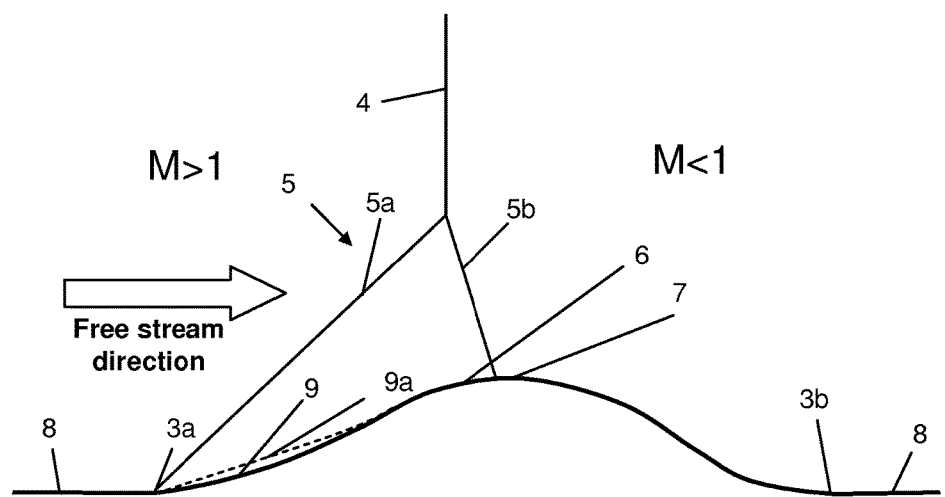
FIGS. 2 and 3 are cross-sectional views through the centre of the bump taken along lines A-A and B-B respectively.
Figure 3:
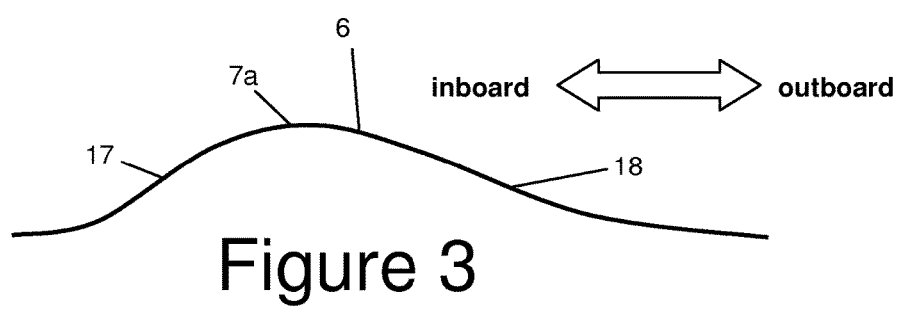

The footprint of a shock bump is indicated at 3 in FIG. 1. FIGS. 2 and 3 are cross-sectional views through the centre 6 of the bump taken along lines A-A and B-B which are parallel with and normal to the free stream direction respectively.

The shock bump protrudes from a nominal surface 8 of the wing, and meets the nominal surface 8 at a leading edge 3a; a trailing edge 3b; an inboard edge 3c; and an outboard edge 3d. The lower portions of the sides of bump are concave and merge gradually into the nominal surface 8. For example in FIG. 2 the lower portion 9 of the front side of the bump merges gradually into the nominal surface 8 at leading edge 3a. Alternatively there may be an abrupt discontinuity at one or more of the edges of the bump. For instance the lower portion of the front side of the bump may be planar as illustrated by dashed line 9a. In this case the front side 9a of the shock bump meets the nominal surface 8 with an abrupt discontinuity at the leading edge 3a.

At transonic speeds a shock 4 forms normal to the upper surface of the wing, and the shock bump 3 is positioned so as to induce a smeared shock foot 5 with a lambda like wave pattern shown in FIG. 2.

When the shock bumps 3 are operated at their optimum with the shock 4 just ahead of the apex 7 of the bump as shown in FIG. 2, the smeared foot 5 has a lambda-like wave pattern with a single forward shock 5a towards the leading edge of the bump and a single rear shock 5b positioned slightly forward of the apex 7. Alternatively, instead of having only a single forward shock 5a, the smeared foot may have a lambda-like wave pattern with a fan-like series of forward shocks.

As shown in FIGS. 2 and 3, the shock bump has asymmetric cross-sections both parallel and transverse to the free stream direction. The longitudinal apex point 7 of the fore/aft cross-section A-A is offset aft of the centre 6 of the bump, and the transverse apex point 7a of the transverse cross-section B-B is offset inboard of the centre 6 of the bump. As shown in FIG. 3, the bump has asymmetric ramps 17,18 on either side of the apex point 7a (the angle of the inboard ramp 17 being greater than the angle of the outboard ramp 18). It is also noted that the apex point of the bump is positioned aft of 50% chord, typically between 60% and 65% chord.

Figure 4:
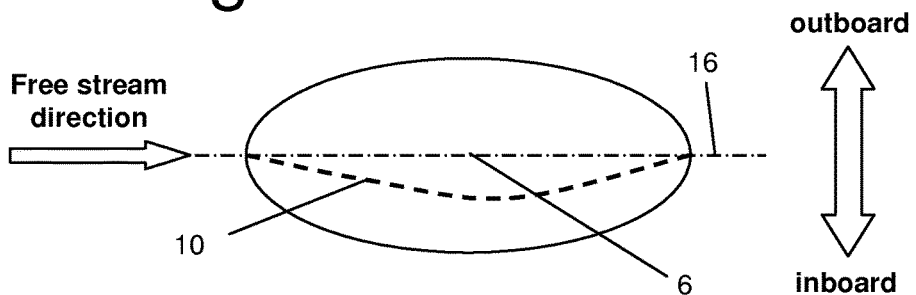
FIG. 4 is a plan view of the bump showing its curved apex line.

As shown in FIG. 4, the transverse apex point of the bump follows a line 10 which appears curved when viewed in plan at a right angle to the surface of the wing.

The shock bump 3 is one of a series of shock bumps distributed along the span of the wing, an additional one of the shock bumps in the series being indicated at 3a in FIG. 1. The bump 3a may have the same asymmetrical shape as the bump 3, or may not.

Figure 5:
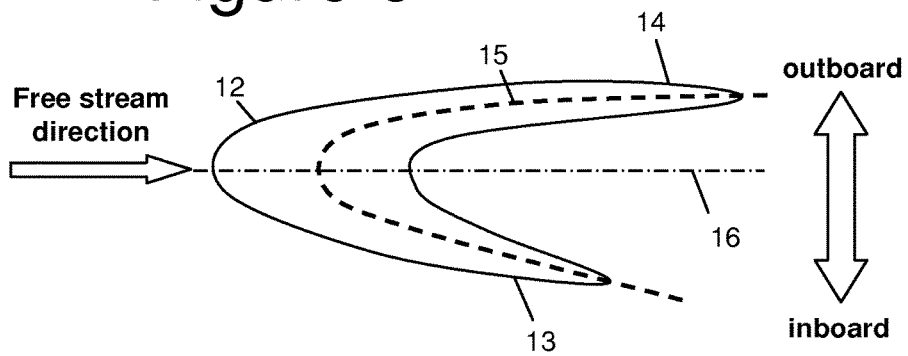
FIG. 5 is a plan view showing the footprint and apex line of a shock bump according to a second embodiment of the invention.
Figure 6:
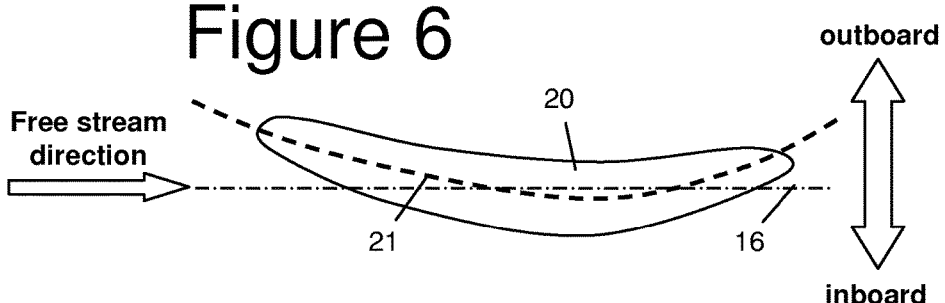
FIG. 6 is a plan view showing the footprint and apex line of a shock bump according to a third embodiment of the invention.

In contrast with conventional symmetrical shock bumps, the shock bump 3 has no plane of symmetry. FIGS. 5 and 6 show the footprints and apex lines of two alternative shock bumps which also have no plane of symmetry. In the case of FIG. 5, the shock bump 12 has a pair of trailing arms 13, 14 which have different lengths, and an apex line 15. FIG. 6 shows a shock bump 20 with an asymmetrical curved apex line 21.

Figure 7:
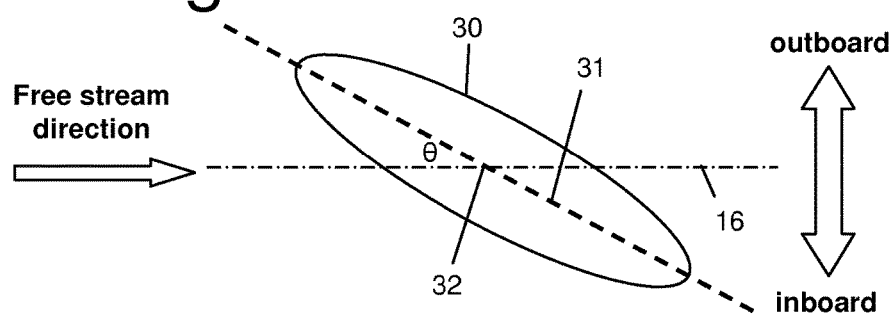
FIG. 7 is a plan view showing the footprint and apex line of a shock bump according to a fourth embodiment of the invention.

FIG. 7 shows a symmetrical shock bump with a straight apex line 31 passing through its centre 32. The apex line 31 is skewed at an acute angle θ to the free stream direction. Although the shock bump has a laterally symmetrical shape, by skewing it relative to the free stream direction, the shock bump becomes asymmetrical about a plane 16 which passes through the centre 32 of the shock bump, is parallel with the free stream direction over the aerofoil and extends at a right angle to the surface of the aerofoil. This plane 16 of asymmetry is also indicated in FIGS. 4-6.

The asymmetric bump configurations described herein offer alternatives that may give improved relaxation of wave drag and shock induced penalties.

The presence of a swept shock or a flow in which the fluid velocity is varying along the span may induce asymmetric wave patterns about a symmetric bump. Such asymmetry may be enhanced for positive benefit by the inclusion of asymmetry on the bump itself The resulting wave pattern would exhibit a different structure on either side of an asymmetric bump.

At an off-design case, for example when trailing vortices are formed, an asymmetric bump may enable differential strength of the flow structures shed from the bumps and this may be used to improve the effectiveness of the bumps. Note that, unlike vortex generators, the bumps have no sharp convex edges or points so the flow remains attached over the bumps when they are operated at their optimum (i.e. when the shock is positioned on the bump just ahead of its apex).

Although the invention has been described above with reference to one or more preferred embodiments, it will be appreciated that various changes or modifications may be made without departing from the scope of the invention as defined in the appended claims.

The invention claimed is:

1. An aerodynamic structure including a surface, said structure comprising a three dimensional shock bump extending from said surface, wherein the shock bump is asymmetrical about a plane of asymmetry, and wherein the plane of asymmetry:
   a. passes through a centre of the shock bump,
   b. is parallel with the free stream direction of said aerodynamic structure, and
   c. extends at a right angle to the surface of the aerodynamic structure.

2. The aerodynamic structure of claim 1 wherein the shock bump has an asymmetrical shape when viewed in cross-section in a plane which is normal to the free stream direction.

3. The aerodynamic structure of claim 2 wherein the asymmetrical cross-sectional shape has an apex which is offset to one side.

4. The aerodynamic structure of claim 1 wherein the shock bump has no plane of symmetry.

5. An aerodynamic structure having a surface, said structure comprising a shock bump extending from said surface, wherein the shock bump has no plane of symmetry.

6. The aerodynamic structure of claim 1 wherein the shock bump has an apex which follows a line which appears curved when viewed at a right angle to the surface of the aerodynamic structure.

7. The aerodynamic structure of claim 1 wherein the shock bump has a leading edge, a trailing edge, an inboard edge and an outboard edge.

8. The aerodynamic structure of claim 7 wherein the shock bump meets the surface at the bump leading edge, bump trailing edge, bump inboard edge and bump outboard edge.

9. The aerodynamic structure of claim 1 wherein the bump has substantially no sharp convex edges or points.

10. The structure of claim 1 wherein the shock bump is shaped and positioned so as to modify the structure of a shock forming adjacent to the surface of the structure when the structure is moved at transonic speed.

11. The structure of claim 10 wherein the shock bump is shaped and positioned so as to induce a smeared foot in the shock with a lambda wave pattern when said aerodynamic structure is moved at transonic speed.

12. The structure of claim 1 wherein the aerodynamic structure is an aerofoil and the surface is a low pressure surface of the aerofoil.

13. The structure of claim 1 wherein the aerodynamic structure is an aerofoil having a leading edge and a trailing edge, and wherein the shock bump has an apex which is positioned towards the trailing edge of the aerofoil.

14. The aerodynamic structure of claim 1 further comprising a pair of trailing arms which have different lengths.

15. The aerodynamic structure of claim 14 wherein the aerodynamic structure has an inboard end and an outboard end, and wherein the shock bump comprises an apex which is offset towards the inboard end of the aerodynamic structure.

16. The aerodynamic structure of claim 1 further comprising at least one additional shock bump extending from said surface.

17. A method of operating the aerodynamic structure of claim 1, the method comprising moving the aerodynamic structure at a transonic speed; forming a shock adjacent to the surface of the aerodynamic structure; and modifying the structure of the shock with the shock bump.

18. The method of claim 17 wherein the shock bump is used to modify the structure of a shock forming adjacent to the surface of the structure when the structure is moved at transonic speed.

19. The method of claim 17 wherein the flow over the shock bump is substantially fully attached when the structure is moved at transonic speed.

20. The method of claim 17 wherein the shock bump induces a smeared foot in the shock with a lambda wave pattern when said aerodynamic structure is moved at transonic speed.

* * * * *